(12) United States Patent
Bremner

(10) Patent No.: US 6,851,754 B2
(45) Date of Patent: Feb. 8, 2005

(54) ARMREST ADJUSTMENT MECHANISM

(75) Inventor: Ronald Dean Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/615,330

(22) Filed: Jul. 8, 2003

(65) Prior Publication Data

US 2005/0006942 A1 Jan. 13, 2005

(51) Int. Cl.[7] .............................................. B60N 2/46
(52) U.S. Cl. .............................................. 297/411.36
(58) Field of Search .......................... 297/115, 411.36, 297/411.33, 411.35, 353, 410; 248/118, 118.3

(56) References Cited

U.S. PATENT DOCUMENTS

| | | | | |
|---|---|---|---|---|
| 2,325,292 A | * | 7/1943 | Westrope ................. | 297/411.21 |
| 3,672,625 A | | 6/1972 | Cazabon et al. ............ | 248/429 |
| 4,165,901 A | | 8/1979 | Swenson et al. ............ | 297/417 |
| 4,647,066 A | | 3/1987 | Walton ....................... | 280/657 |
| 4,657,305 A | * | 4/1987 | Meiller ................... | 297/411.36 |
| 4,702,520 A | | 10/1987 | Whisler et al. ............. | 297/417 |
| 4,877,287 A | * | 10/1989 | Escaravage ............ | 297/411.36 |
| 4,984,847 A | | 1/1991 | Bedu et al. ................. | 297/411 |
| 5,558,404 A | | 9/1996 | Muzzy et al. .......... | 297/411.38 |
| 5,727,759 A | * | 3/1998 | Christensen ................. | 248/118 |
| 5,876,097 A | * | 3/1999 | Cao ....................... | 297/411.37 |
| 5,941,603 A | * | 8/1999 | Wein ...................... | 297/411.35 |
| 5,947,554 A | * | 9/1999 | Mashkevich ................ | 297/115 |
| 6,209,840 B1 | * | 4/2001 | Chen ........................ | 248/407 |
| 6,470,874 B1 | | 10/2002 | Mertes ........................ | 125/12 |

FOREIGN PATENT DOCUMENTS

JP         01017611 A    *   1/1989    ............ A47C/7/54

* cited by examiner

Primary Examiner—Peter R. Brown

(57) ABSTRACT

An armrest adjustment mechanism supports an armrest unit with respect to a vehicle seat. The mechanism includes a plate fixed to the seat. The fixed plate has a pair of projecting pins and a plate slot extending between the pins. A frame is movably mounted adjacent to the plate and attached to the armrest unit. The frame has a bore extending therethrough and a pair of frame slots which slidably receive the pins. A bolt has a head which non-rotatably engages the plate and which is slidable in the plate slot. The bolt has a threaded shaft which extends through the bore in the plate. A knob is rotatably and threadably mounted on the end of the shaft. A hollow cylindrical bushing is mounted on the shaft between the knob and the frame. The knob can be rotated to clamp the frame with respect to the plate, or loosened to allow the frame to be moved with respect to the plate.

14 Claims, 3 Drawing Sheets

ARMREST ADJUSTMENT MECHANISM

BACKGROUND

The present invention relates to an adjustable armrest for a vehicle.

Many vehicles, such as tractors, have armrests which are adjustable in height to accommodate people with different body shapes. For example, an armrest adjustable mechanism is described in U.S. Pat. No. 5,558,404, issued 24 Sep. 1996 to Muzzy et al, and assigned to the assignee of this application. This design includes castings, special injection molded plastic parts, a belt, and hardware. Some of the parts must have tight tolerances, to minimize free-play in the assembly. The belt wraps around a pair of sprockets to keep the sprockets synchronized. The belt is tensioned by a bushing which presses against the belt. The belt is driven by a plastic gear. The gear is moved through a shaft, which is turned by a knob. The knob has a spring inside it, to keep it pushed out. This design results in a complex assembly. To adjust this mechanism, the operator must simultaneously execute complex and unnatural pushing and twisting motions.

Armrests with adjustable mechanisms are found on production tractors manufactured by John Deere, AgCo, Case-IH and Caterpillar. Such adjustment mechanisms tend to be complex, and require parts which have tight tolerances. Some such mechanisms are difficult to adjust. Some such mechanisms may also have loosely fitting parts which generate undesirable noise when a vehicle vibrates as a result of its movement. Some such mechanisms require parts which are expensive, and require expensive tooling to manufacture.

SUMMARY

Accordingly, an object of this invention is to provide a simple and inexpensive armrest adjustment mechanism.

A further object of the invention is to provide such an armrest adjustment mechanism which is sturdy and quiet.

These and other objects are achieved by the present invention, wherein an armrest adjustment mechanism includes a fixed plate and a movable frame. The plate has a pair of studs projecting from a side thereof and slot extending therein. The frame has a pair of frame slots formed therein. Each frame slot slidably receives a corresponding one of the studs. The frame also has a bore extending therethrough. A carriage bolt member has a head engaging a second side of the plate and a shaft extending from the head and through the plate slot and the bore. A knob is rotatably and threadably mounted on the threaded end of the shaft. A hollow cylindrical bushing is mounted on the shaft between the knob and the frame. The head of the bolt includes a square shank which is slidably and non-rotatably received in the plate slot.

DETAILED DESCRIPTION

Figure 1:
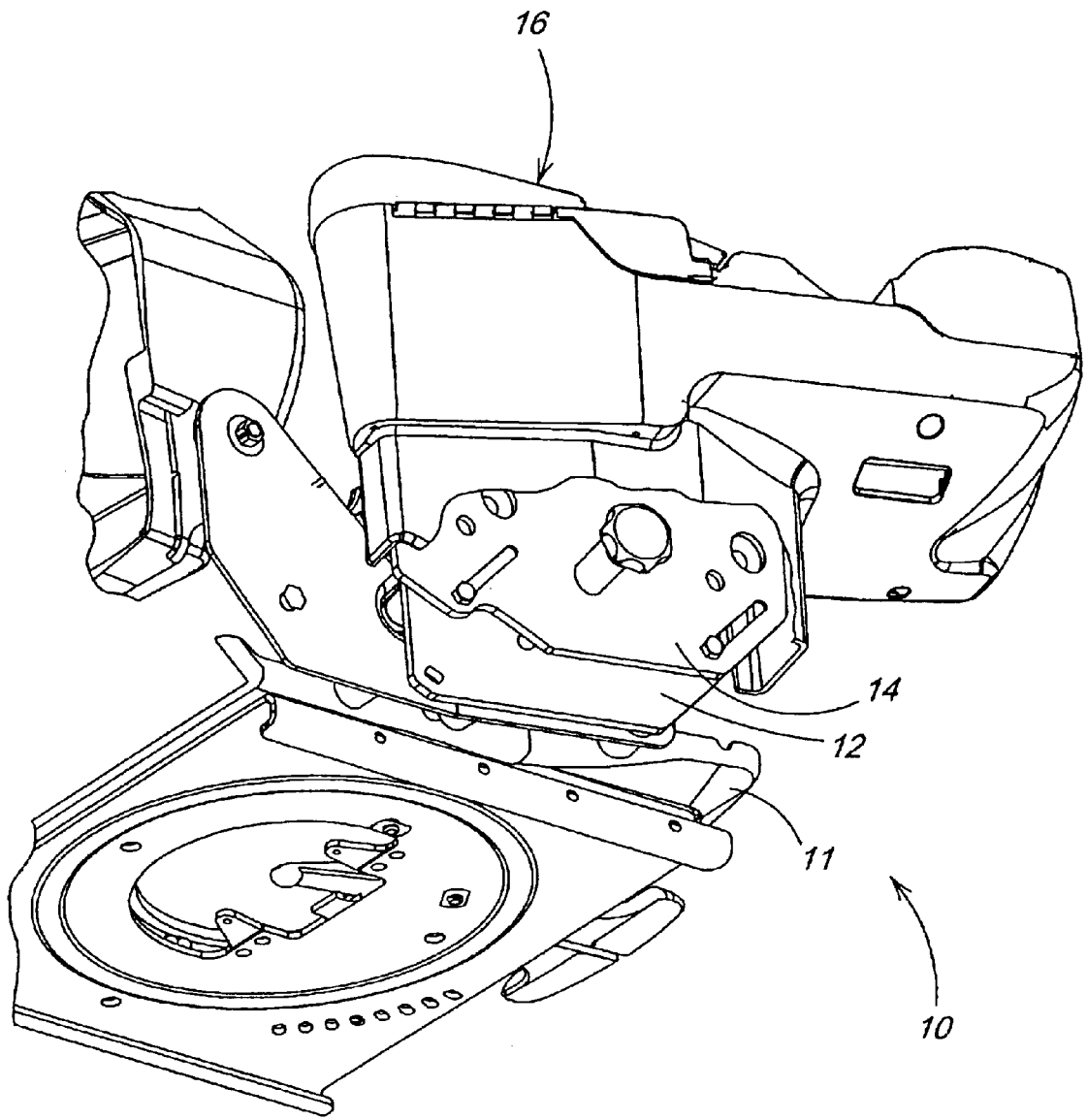
FIG. 1 is a perspective view of a seat with an armrest adjustment mechanism according to the present invention.

Referring to FIG. 1, an armrest adjustment mechanism 10 includes a plate 12 which is fixed to a seat base 11, and a movable frame 14 which carries an armrest unit 16. Referring now to FIGS. 2, 3, 4 and 5, mechanism 10 includes a pair of pins or studs 18, 20 which are fixed to and projecting from an outer side of the plate 12. A plate slot 22 extends diagonally between the pins 18, 20 in a central portion of the plate 12. The pins 18, 20 may be pressed into or threadably received in threaded bores 17 in the plate 12.

The frame 14 is slidably mounted adjacent to the plate 12. The frame 14 has a pair of diagonal frame slots 24, 26 formed therein. Each of the slots 22, 24 and 26 has a lower end which is located to the rear of its upper end. Each frame slot 24, 26 slidably receives a corresponding one of the studs 18, 20. Frame 14 also has a bore 30 extending through a central portion of the frame 14 between slots 24, 26. The upper portion of frame 14 is bent to form a horizontally extending armrest unit support member 15.

Figure 5:
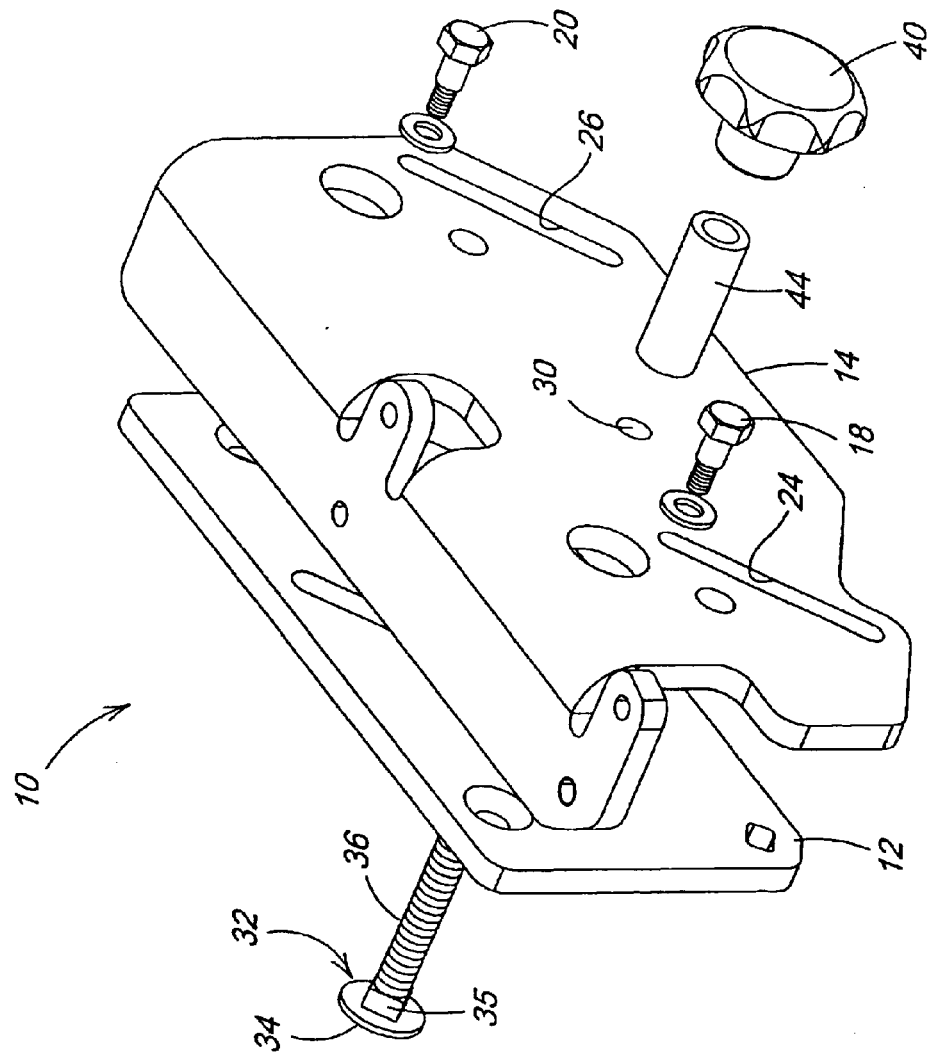
FIG. 5 is an exploded perspective view of an armrest adjustment mechanism according to the present invention.
Figure 4:
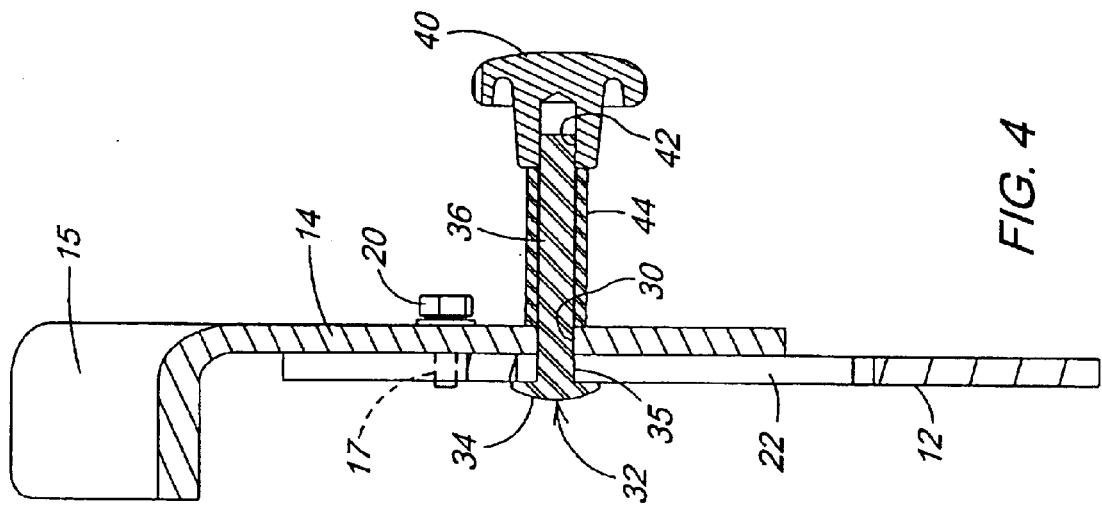
FIG. 4 is a sectional view taken along lines 4–4 of FIG. 2.

As best seen in FIG. 4, the mechanism 10 includes a bolt member 32, such as a carriage bolt. The bolt member 32 has a head 34 which engages an inner side of the plate 12. As best seen in FIGS. 4 and 5, next to head 34, bolt 32 has a non-circular or square shank 35 which is slidably and non-rotatably received in the plate slot 22, and a threaded shaft 36 which projects from the shank 35 and extends through the bore 30. A knob 40 has an internally threaded bore 42 which rotatably and threadably receives an end of the shaft 36. A hollow cylindrical bushing 44 is mounted on the shaft 36 and extends between the knob 40 and the frame 14.

Figure 2:
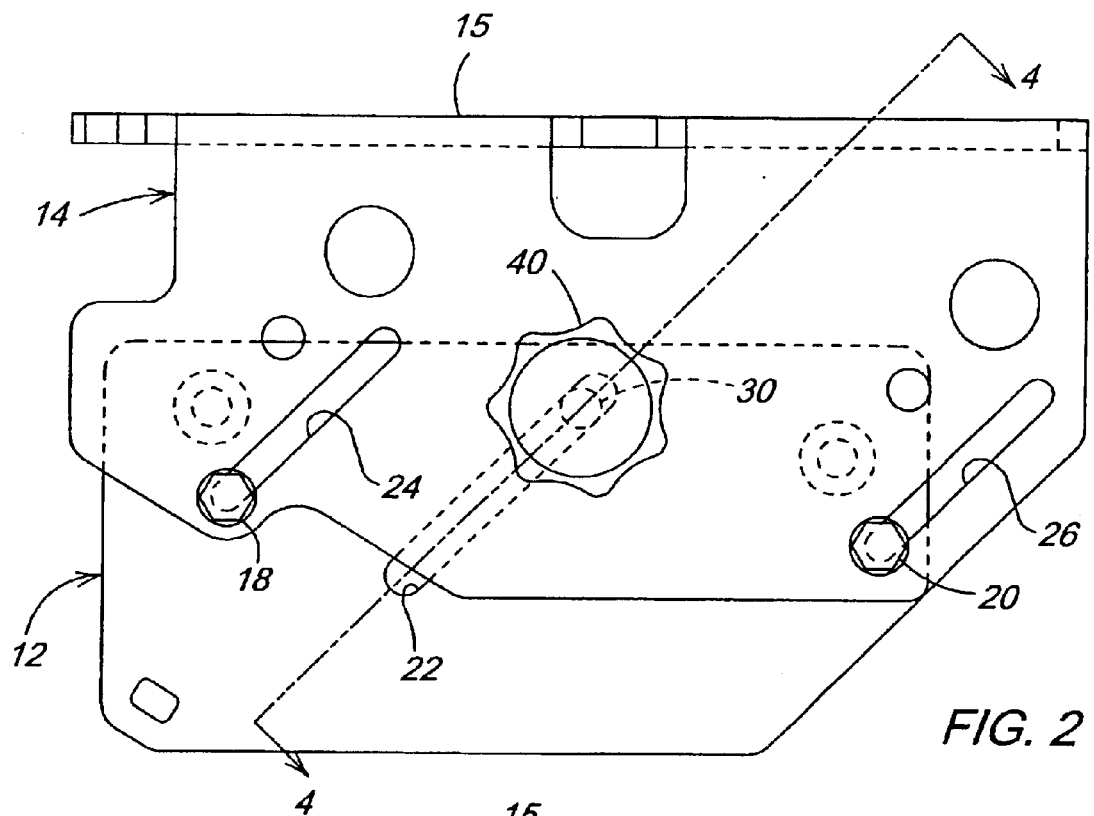
FIG. 2 is a side view of an armrest adjustment mechanism according to the present invention.
Figure 3:
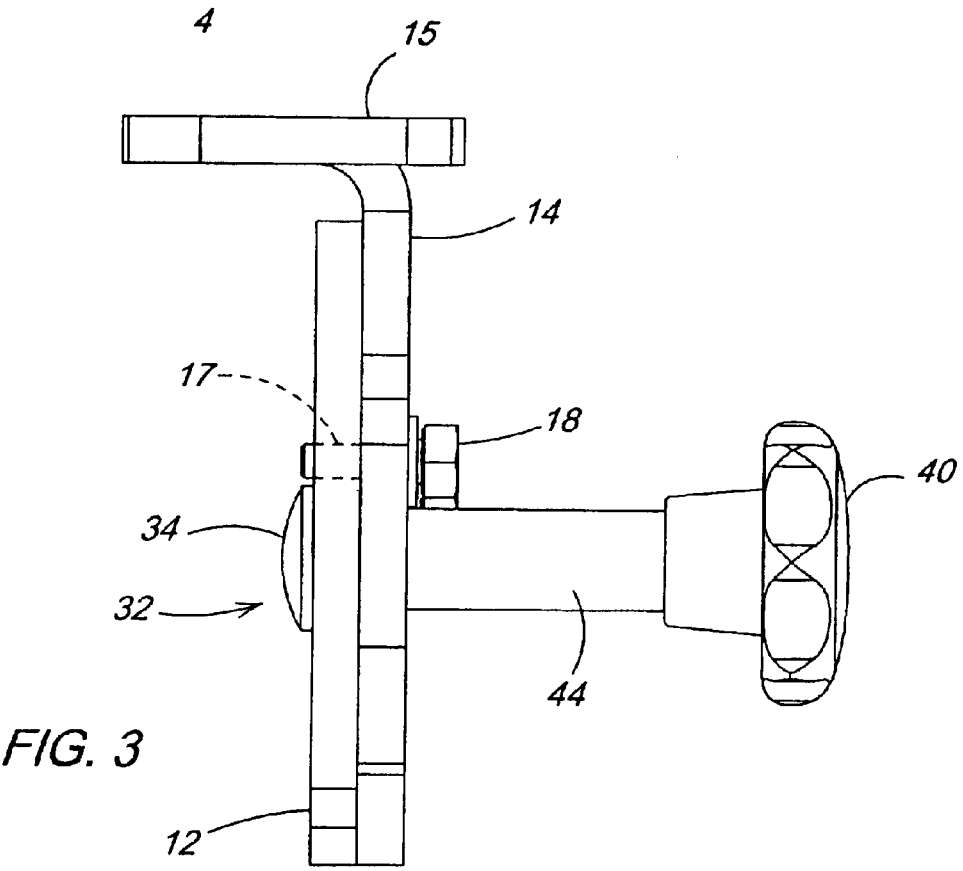
FIG. 3 is an end view of an armrest adjustment mechanism according to the present invention.

When the knob 40 is tightened down on the bolt 32, the bushing 44 clamps the frame 14 against plate 12 and prevents movement of frame relative to plate 12. When the knob 40 is un-tightened with respect to the bolt 32, the bushing 44 releases the frame 14, and allows the frame 14, the bolt 32, the bushing 44 and the knob 40 to be moved together with respect to the plate 12. As best seen in FIGS. 1 and 2, the frame 14 can be moved upwardly and forward with respect to plate 12 and downwardly and rearwardly with respect to plate 12. When the knob 40 is tightened, the parts of the mechanism 10 are unable to rattle against each other and produce noise as a result of vehicle produced vibration.

The above armrest adjustment mechanism requires only 2 custom-made parts, the plate 12 and frame 14, and both can be made of sheet metal. Only the frame 14 must be formed. The plate 12 and frame 14 may be either stamped or laser cut. No welding is required, as the pins 18, 20 may be pressed into the plate 12, or the pins may be shouldered screws which are screwed into the plate 12. When the carriage bolt 32 is tightened by the knob 40 the frame 14 is clamped to the plate 12 and the frame 14 will not move relative to the fixed plate. The clearances between the slots and pins are eliminated or greatly reduced, as gravity forces the pins against the slots, before the joint is tightened. The result is a mechanism which has no free motion in the assembly, except for flexing of materials. There will be very little flexing if the plate and frame are made from 8 millimeter thick steel. This mechanism can be adjusted simply and easily with a loosening motion, then a lifting motion, then a tightening motion. The result is an inexpensive mechanism which is easier to assemble, which has fewer parts, lower tolerances, and is more rigid.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An armrest adjustment mechanism for supporting an armrest unit, the mechanism comprising:
   a fixed plate having a pair of pins projecting from a first side thereof and having a plate slot extending therein;
   a frame mounted adjacent to the plate and attached to the armrest unit, the frame having a pair of frame slots formed therein, each frame slot slidably receiving a corresponding one of the pins, the frame also having a bore extending therethrough;
   a bolt member, the bolt member having a head engaging a second side of the plate and a shaft extending from the head and through the plate slot and the bore, the shaft having a threaded free end;
   a knob having a bore with internal threads for rotatably and threadably engaging the threaded end of the shaft; and
   a hollow cylindrical bushing mounted on the shaft between the knob and the frame.

2. The armrest adjustment mechanism of claim 1, wherein:
   frame slots are spaced apart on opposite sides of the bore.

3. The armrest adjustment mechanism of claim 1, wherein:
   the plate slot and the frame slots are parallel to each other.

4. The armrest adjustment mechanism of claim 1, wherein:
   the plate slot and the frame slots all extend diagonally.

5. The armrest adjustment mechanism of claim 1, wherein:
   the plate slot is located between the pins.

6. The armrest adjustment mechanism of claim 1, wherein:
   the frame, the bolt member and the knob are movable together with respect to the plate.

7. A method of adjusting an armrest adjustment mechanism for supporting an armrest unit, the mechanism comprising a fixed plate having a pair of pins projecting from a first side thereof and having a plate slot extending therein, a frame mounted adjacent to the plate and attached to the armrest unit, the frame having a pair of frame slots formed therein, each frame slot slidably receiving a corresponding one of the pins, the frame also having a bore extending therethrough, a bolt member, the bolt member having a head engaging a second side of the plate and a shaft extending from the head and through the plate slot and the bore, the shaft having a threaded free end, and a knob having a bore with internal threads for rotatably and threadably engaging the threaded end of the shaft, the method comprising the following steps:
   untightening the knob on the bolt;
   shifting the frame relative to the plate; and
   tightening the knob on the bolt.

8. An armrest adjustment mechanism for supporting an armrest unit, the mechanism comprising:
   a fixed plate having a pair of pins projecting from a first side thereof and having a plate slot extending therein;
   a frame mounted adjacent to the plate and attached to the armrest unit, the frame having a pair of frame slots formed therein, each frame slot slidably receiving a corresponding one of the pins, the frame also having a bore extending therethrough;
   a bolt member, the bolt member having a head engaging a second side of the plate and a shaft extending from the head and through the plate slot and the bore, the shaft having a threaded free end, the head of the bolt includes a non-circular shank member which is slidably and non-rotatably received in the plate slot; and
   a knob having a bore with internal threads for rotatably and threadably engaging the threaded end of the shaft.

9. An armrest adjustment mechanism for supporting an armrest unit, the mechanism comprising:
   a fixed plate having a pair of pins projecting from a first side thereof and having a plate slot extending therein;
   a frame mounted adjacent to the plate and attached to the armrest unit, the frame having a pair of frame slots formed therein, each frame slot slidably receiving a corresponding one of the pins, the frame having a bore extending therethrough between the frame slots; and
   a clamping assembly for releasably clamping the frame to the plate, the clamping assembly being movable with the frame with respect to the plate, the clamping assembly having a portion which is non-rotatably and slidably received in the plate slot, and a portion of the clamping assembly extending through the bore, the clamping assembly comprising a bolt member with a head and a threaded shaft, the head being slidably and non-rotatably coupled to the plate, and the shaft extending from the head and through the plate slot and the bore, a knob having a bore with internal threads for rotatably and threadably engaging the threaded end of the shaft, and a hollow cylindrical bushing mounted on the shaft between the knob and the frame.

10. The armrest adjustment mechanism of claim 9, wherein:
    the frame, the bolt member and the knob are movable together with respect to the plate.

11. The armrest adjustment mechanism of claim 9, wherein:
    the plate slot and the frame slots are parallel to each other.

12. The armrest adjustment mechanism of claim 9, wherein:
    the plate slot and the frame slots all extend diagonally.

13. The armrest adjustment mechanism of claim 9, wherein:
    the plate slot is located between the pins.

14. An armrest adjustment mechanism for supporting an armrest unit, the mechanism comprising:
    a fixed plate having a pair of pins projecting from a first side thereof and having a plate slot extending therein;
    a frame mounted adjacent to the plate and attached to the armrest unit, the frame having a pair of frame slots formed therein, each frame slot slidably receiving a corresponding one of the pins, the frame having a bore extending therethrough between the frame slots; and
    a clamping assembly for releasably clamping the frame to the plate, the clamping assembly being movable with the frame with respect to the plate, the clamping assembly having a portion which is non-rotatably and slidably received in the plate slot, a portion of the clamping assembly extending through the bore, the clamping assembly comprising a bolt member with a head and a threaded shaft, the head being slidably and non-rotatably coupled to the plate, and the shaft extending from the head and through the plate slot and the bore, and the clamping assembly comprising a knob having a bore with internal threads for rotatably and threadably engaging the threaded end of the shaft, and the head of the bolt member includes a non-circular shank which is slidably and non-rotatably received in the plate slot.

* * * * *